(12) United States Patent
Chambers et al.

(10) Patent No.: US 7,012,379 B1
(45) Date of Patent: Mar. 14, 2006

(54) CUTTABLE ILLUMINATION DEVICE

(75) Inventors: Joe A. Chambers, Cookeville, TN (US); John R. Dominick, Cookeville, TN (US); Eric Olav Eriksson, Evanston, IL (US)

(73) Assignee: iLight Technologies, Inc., Chicago, IL (US)

(*) Notice: Subject to any disclaimer, the term of this patent is extended or adjusted under 35 U.S.C. 154(b) by 204 days.

(21) Appl. No.: 10/810,141

(22) Filed: Mar. 26, 2004

Related U.S. Application Data (60) Provisional application No. 60/458,154, filed on Mar. 27, 2003.

(51) Int. Cl.
*H05B 37/00* (2006.01)

(52) U.S. Cl. .............................. 315/200 A; 315/185 S; 315/312; 315/323; 362/800; 362/806

(58) Field of Classification Search ...................... None
See application file for complete search history.

(56) References Cited

U.S. PATENT DOCUMENTS

| | | | | |
|---|---|---|---|---|
| 5,805,717 A | * | 9/1998 | Mills | 381/110 |
| 6,239,716 B1 | * | 5/2001 | Pross et al. | 340/815.4 |
| 6,489,728 B1 | * | 12/2002 | Guthrie et al. | 315/200 A |
| 6,650,064 B1 | * | 11/2003 | Guthrie et al. | 315/185 R |
| 6,734,875 B1 | * | 5/2004 | Tokimoto et al. | 345/690 |
| 6,776,504 B1 | | 8/2004 | Sloan et al. | |

* cited by examiner

*Primary Examiner*—Tuyet Thi Vo
(74) *Attorney, Agent, or Firm*—Stites & Harbison, PLLC; Jeffrey A. Haeberlin; David W. Nagle, Jr.

(57) ABSTRACT

A cuttable illumination device has a first lamp, a second lamp, a current source element, and a voltage breakdown element connected such that the first lamp may be removed from the device without affecting the function and performance of the remaining portion of the illumination device. Additional lamps may be added to the device in conjunction with additional voltage breakdown elements to form a string of lamps where any number of lamps may be removed without affecting the function and performance of the remaining portion of the device. The device may have a waveguide member and a housing, creating a cuttable illumination device for simulating neon lighting.

27 Claims, 7 Drawing Sheets

CUTTABLE ILLUMINATION DEVICE

CROSS-REFERENCE TO RELATED APPLICATIONS

The present application claims priority to U.S. Provisional Application Ser. No. 60/458,154 filed Mar. 27, 2003, the entire disclosure of which is incorporated herein by reference. This application also relates to U.S. Utility patent application Ser. No. 09/982,705 filed Oct. 15, 2001, now U.S. Pat. No. 6,592,238, issued Jul. 15, 2003, entitled Illumination Device for Simulating Neon Lighting, the entire disclosure of which is incorporated herein by reference.

BACKGROUND OF THE INVENTION

The present invention relates to a cuttable illumination device for simulating neon lighting, an illumination device ideally adapted for lighting, signage and advertising uses.

Neon lighting, which is produced by the electrical stimulation of the electrons in the low-pressure neon gas-filled glass tube, has been a main stay in advertising and for outlining channel letters and building structures for many years. A characteristic of neon lighting is that the tubing encompassing the gas has an even glow over its entire length irrespective of the viewing angle. This characteristic makes neon lighting adaptable for many advertising applications, including script writing and designs, because the glass tubing can be fabricated into curved and twisted configurations simulating script writing and intricate designs. The even glow of neon lighting being typically devoid of hot spots allows for advertising without visual and unsightly distractions. Thus, any illumination device that is developed to duplicate the effects of neon lighting must also have even light distribution over its length and about its circumference. Equally important, such lighting devices must have a brightness that is at least comparable to neon lighting. Further, since neon lighting is a well-established industry, a competitive lighting device must be lightweight and have superior "handleability" characteristics in order to make inroads into the neon lighting market. Neon lighting is recognized as being fragile in nature. Because of the fragility and heavy weight, primarily due to its supporting infrastructure, neon lighting is expensive to package and ship. Moreover, it is extremely awkward to initially handle, install, and/or replace. Any lighting device that can provide those previously enumerated positive characteristics of neon lighting, while minimizing its size, weight, and handleability shortcomings, will provide for a significant advance in the lighting technology.

An additional characteristic of neon lighting is that it can be fabricated in multiple or variable lengths. Thus, it is necessary for an illumination device for simulating neon to also be available in multiple or variable lengths. Furthermore, it is desirable for such a neon simulating illumination device to be capable of having its length shortened, trimmed or cut at the installation site, rather than having to be custom manufactured to the desired lengths.

The introduction of lightweight and breakage resistant point light sources, as exemplified by high-intensity light-emitting diodes (LEDs), have shown great promise to those interested in illumination devices that may simulate neon lighting. This has stimulated research and development in the area of illumination devices for simulating neon lighting. However, the twin attributes of neon lighting, uniformity and brightness, have proven to be difficult obstacles to overcome as such attempts to simulate neon lighting.

For example, U.S. Pat. No. 4,976,057 issued Dec. 11, 1990 to Bianchi describes a device that includes a transparent or translucent hollow plastic tubing mounted in juxtaposition to a sheet of material having light transmitting areas that are co-extensive to the tubing. The sheet is backlit by light sources such as LEDs which trace the configuration of the tubing. The tubing can be made into any shape including lettering. While the tubing may be lit by such arrangement, the light transfer efficiencies with such an arrangement is likely to result in a "glowing" tube having insufficient intensity to match that of neon lighting. The use of point light sources such as LEDs may provide intense light that rival or exceed neon lighting, but when arranged in arrays, lack the uniformity needed and unfortunately provide alternate high and low intensity regions in the illuminated surfaces. Attempts to smooth out the light have resulted in lighting that has unacceptably low intensity levels.

In an attempt to address some of the shortcomings of neon, commonly assigned U.S. Pat. No. 6,592,238, which has been incorporated in its entirety herein by reference, describes an illumination device comprising a profiled rod of material having waveguide properties that preferentially scatters light entering one lateral surface ("light-receiving surface") so that the resulting light intensity pattern emitted by another lateral surface of the rod ("light-emitting surface") is elongated along the length of the rod. A light source extends along and is positioned adjacent to the light-receiving surface and spaced from the light-emitting surface a distance sufficient to create an elongated light intensity pattern with a major axis along the length of the rod and a minor axis that has a width that covers substantially the entire circumferential width of the light-emitting surface. In a preferred arrangement, the light source is a string of point light sources spaced a distance apart sufficient to permit the mapping of the light emitted by each point light source into the rod so as to create elongated and overlapping light intensity patterns along the light-emitting surface and circumferentially about the surface so that the collective light intensity pattern is perceived as being uniform over the entire light-emitting surface.

One of the essential features of the illumination device described and claimed in U.S. Pat. No. 6,592,238 is the uniformity and intensity of the light emitted by the illumination device. While it is important that the disadvantages of neon lighting be avoided (for example, weight and fragility), an illumination device would have little commercial or practical value if the proper light uniformity and intensity could not be obtained. This objective is achieved primarily through the use of a "leaky" waveguide rod. A "leaky" waveguide is a structural member that functions both as an optical waveguide and as a light scattering member. As a waveguide, it tends to preferentially direct light entering the waveguide, including the light entering a lateral surface thereof, along the axial direction of the waveguide, while as a light scattering member, it urges the light out of an opposite lateral surface of the waveguide. As a result, what is visually perceived is an elongated light pattern being emitted along the light-emitting lateral surface of the waveguide.

As described in U.S. Pat. No. 6,592,238, certain acrylics, polycarbonates, and epoxys have the desired preferential light scattering properties needed to produce a leaky waveguide; for example, one such acrylic material is commercially available from AtoHaas, Philadelphia, Pa. under order number DR66080. These compounds are extremely lightweight and are able to withstand rough shipping and handling. These compounds can be easily molded or extruded into a desired shape for a particular illumination application and thereafter heated and bent to a final desired shape or shapes.

Furthermore, such compounds can be easily cut or trimmed into a desired shape or length. However, once the point light sources and associated circuit elements, including any circuit substrate or circuit board, have been positioned in a housing continuous with the waveguide, any such cutting or trimming would necessarily cut off some point light sources and associated circuit elements. This could potentially cause the remaining portion of the device to stop functioning or perform radically different from the desired characteristics.

Therefore, there is a need for an illumination device for simulating neon lighting using a string of point light sources having a construction that allows for the cutting or trimming of the device to a desired length, including cutting or trimming off one or more of the individual point light sources without adversely effecting the function and performance of the remaining portion of the illumination device.

SUMMARY OF THE INVENTION

This need, and others, are met by providing a cuttable illumination device having a first lamp, a second lamp, a current source element, and a voltage breakdown element. The first lamp has an input and an output. The second lamp also has an input and an output, the second lamp input being connected to the first lamp output such that the lamps are connected in series. The current source element has a substantially constant current characteristic and is connected to the second lamp output. Additionally, the first lamp has a voltage drop characteristic that corresponds to the current characteristic of the current source element. The voltage breakdown element also has an input and an output. The voltage breakdown element input is connected to the first lamp input, and the voltage breakdown element output is connected to the first lamp output. Thus, the voltage breakdown element is connected across the first lamp. The voltage breakdown element has a breakdown voltage characteristic that is greater than the voltage drop characteristic of the first lamp, such that the voltage breakdown element will normally appear as an open circuit. However, upon removal of the first lamp from the circuit, the voltage breakdown element will conduct current, allowing the remaining circuit to have continued operation.

According to one aspect of the invention, the lamps may be light-emitting diodes (LEDs). Additionally, the voltage breakdown element may be a Zener diode having a voltage breakdown characteristic that is greater than the maximum forward voltage characteristic of the first LED.

According to another aspect of the invention, the current source element may be a voltage regulator combined with a load resistor. The voltage regulator has an input, an output, and a ground connection. The voltage regulator input may be connected to the output of the second lamp. The voltage regulator ground connection may be connected to ground. The voltage regulator will have a substantially fixed output voltage characteristic, and a ground current characteristic that is negligible. Thus, the voltage regulator output current will substantially equal the input current. By connecting the load resistor between the voltage regulator output and ground, the substantially fixed output voltage characteristic of the voltage regulator will create a substantially constant current.

According to yet another aspect of the invention, the cuttable illumination device may have an elongated circuit board element to which the circuit elements are mounted. The circuit board element may have a distal portion and a remaining portion. The first LED is mounted to the circuit board distal portion, and the Zener diode and the second LED are mounted to the remaining portion. Thus, the circuit board distal portion may be cut from the circuit board remaining portion, thereby severing the first LED from the cuttable illumination device.

In yet another aspect of the invention, the cuttable illumination device further has a waveguide member having a rod-like shape, a predetermined length, a lateral light-receiving surface, and a lateral light-emitting surface. The waveguide member is composed of a material that has both optical waveguide and light-scattering properties. The light-receiving surface of the waveguide member is positioned adjacent to the LEDs such that light from the LEDs entering the waveguide will be scattered causing a light intensity pattern that appears substantially uniform along the light-emitting surface of the waveguide member. Additionally, the device may further have a housing positioned below and extending along the waveguide member, where the housing encloses the circuit board, the LEDs, and the Zener diode. Still further, the housing may have a pair of sidewalls and a floor portion connecting the sidewalls where the sidewalls and floor portion have reflective internal surfaces. Lastly, even further still, the position of the circuit board, the LEDs, and the Zener diode within the housing may be maintained by filling the housing with a potting material.

In yet another aspect of the invention, the cuttable illumination device may further have a number of additional LED/Zener diode sections. In this aspect, each successive LED/Zener diode section will have an LED and a Zener diode. The LED will be inserted between the output of the LED of the previous section and the input of the voltage regulator. The Zener diode will be placed across the preceding section such that the Zener diode input is connected to the input of the Zener diode of the previous section, and the Zener diode output is connected to the output of the LED of the previous section. By selecting a voltage breakdown characteristic of the Zener diode that is greater than the sum of the maximum forward voltage drops of the previous section LEDs, the Zener diode will act as a normally open circuit, but allow completion of the circuit in the event that the previous section LEDs are cut from the circuit.

DETAILED DESCRIPTION OF THE INVENTION

The present invention is a cuttable illumination device for simulating neon lighting using a string of point light sources and having a construction that allows for the cutting or trimming of the device to a desired length. The preferred illumination device uses a high-intensity, but dimensionally small, light source together with an element that acts both as an optical waveguide and light scattering member, thus permitting light to exit laterally out of its surface. As described in related U.S. Pat. No. 6,592,238, which has been incorporated in its entirety by reference, this element is referred to as a "leaky waveguide." By placing the light source contiguous to such a leaky waveguide in a specific manner so as to cause the waveguide to uniformly glow over its lateral surface, applicants are able to obtain an illumination device that rivals or surpasses the uniform glow of neon tubing. A combination of circuit elements allows cutting or trimming of the device to a desired length.

There are many light sources which provide the necessary light intensity; however, the presently preferred light source for the purpose here intended is a series of contiguously mounted point light sources, such as high-intensity LEDs. By spacing the LEDs a certain distance apart, and positioning each LED an appropriate distance from the leaky waveguide, the light intensity distribution patterns on the surface of the of the leaky waveguide are caused to overlap to such an extent that the variations in the patterns are evened out. This causes the collective light pattern on the lateral surface to appear to an observer to have a uniform intensity along the length of the waveguide.

As mentioned above, the compounds used to construct the waveguide can be easily cut or trimmed into a desired shape or length, but once the LEDs and associated circuit elements have been positioned in a housing contiguous to the waveguide, no such cutting or trimming is possible without also cutting through the circuit board. Therefore, the illumination device of the present invention is constructed such that it can be cut anywhere along its length and through the circuit board, yet the remaining portion of the circuit continues to function, and the illumination device continues to perform.

Figure 1:
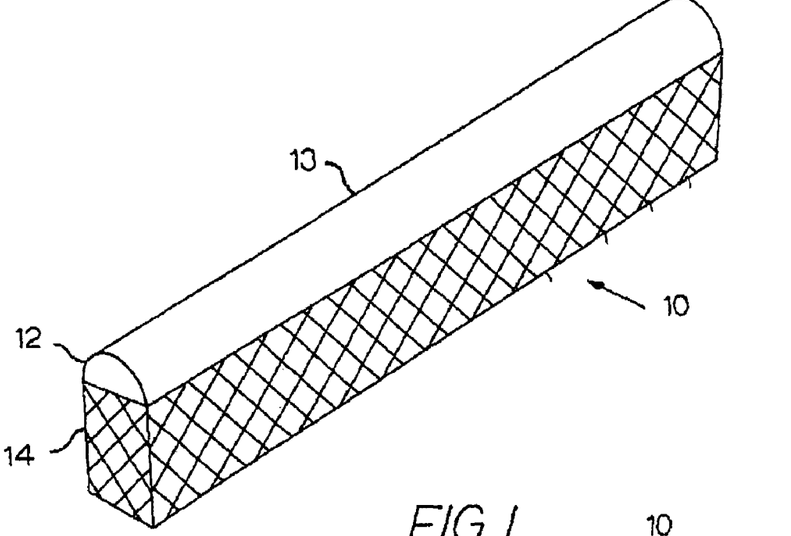
FIG. 1 is a perspective view of an exemplary embodiment of a cuttable illumination device made in accordance with the present invention.
Figure 2:
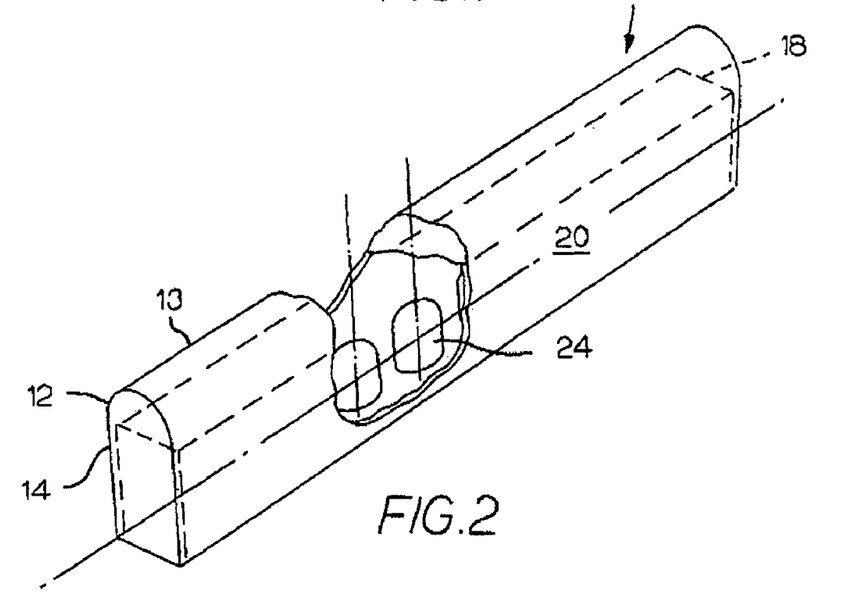
FIG. 2 is a perspective view similar to FIG. 1, but with a portion broken away to show the interior of the cuttable illumination device.
Figure 3:
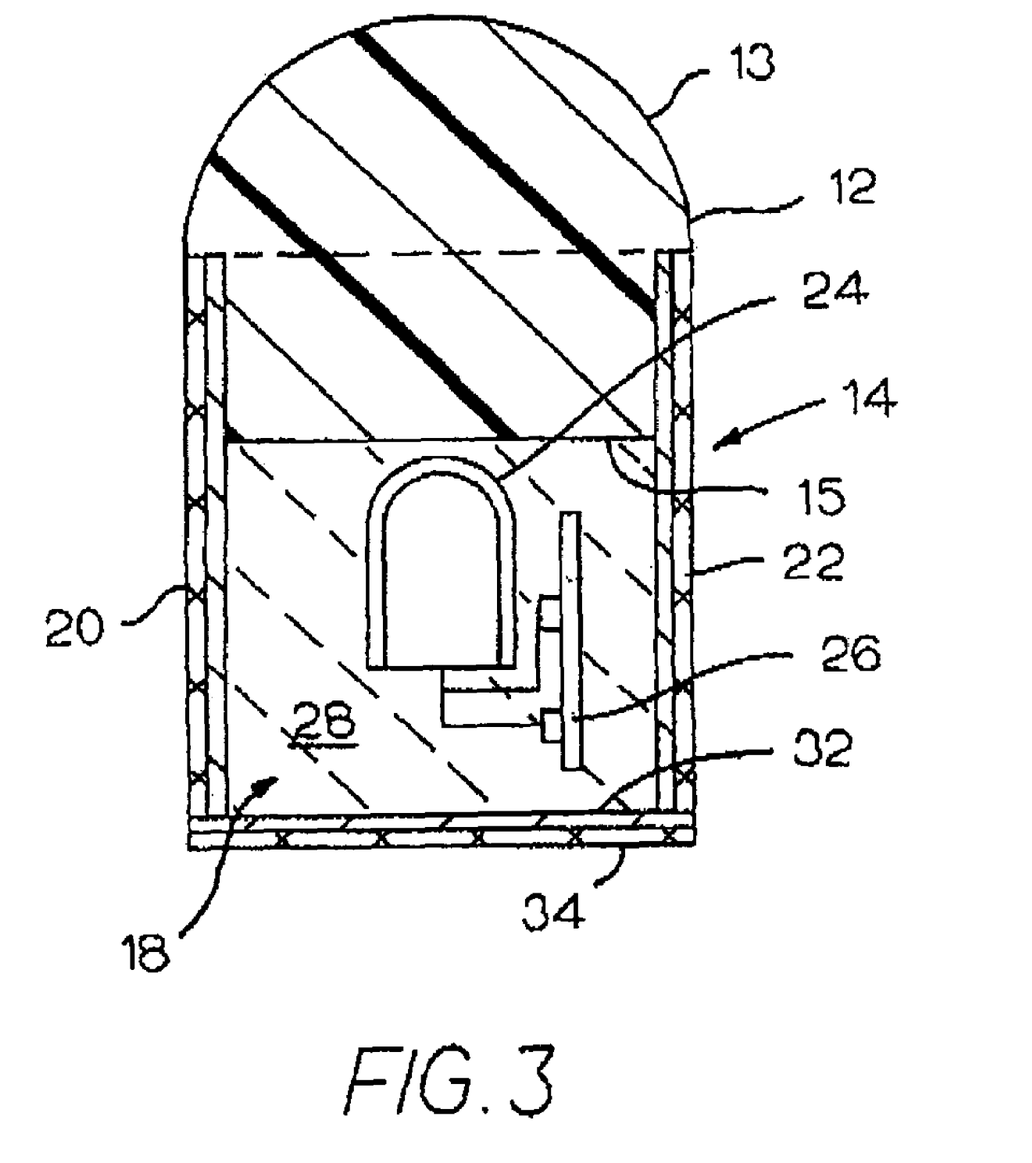
FIG. 3 is a sectional view of the cuttable illumination device of FIGS. 1 and 2.

Referring now to FIGS. 1–3, an exemplary embodiment of an illumination device 10 made in accordance with the present invention generally comprises a waveguide 12, a housing 14, and a light source 24. The waveguide 12 is the aforementioned leaky waveguide. In this exemplary embodiment, the waveguide 12 of the illumination device 10 is a rod-like member and has a curved lateral surface 13 serving as the light-emitting surface of the waveguide 12 and an internal lateral surface 15 (as best illustrated in FIG. 3) that serves as the light-receiving surface. Although such a geometry is desirable because it simulates a neon tube, the waveguide 12 could also be produced in various other shapes. Light entering the waveguide 12 of the illumination device 10 from the light source 24 and through the light-receiving surface 15 is preferentially scattered so as to exit with a broad elongated light intensity distribution pattern out of the light-emitting surface 13.

As mentioned above and as illustrated in FIGS. 1-3, one preferred light source 24 is a plurality of LEDs spaced a predetermined distance from one another. The light source 24 and accompanying circuit elements, including a circuit board 26, are positioned within the housing 14. The circuit board 26 could be flexible or rigid. Additionally, the circuit elements of the invention could be electrically connected directly to each other, or in any other equivalent manner, without departing from the spirit and scope of the invention and as further described below.

In this exemplary embodiment, the housing 14 is positioned below the waveguide 12 such that the light source 24 emits light into the light-receiving surface 15 of the waveguide. The housing 14 generally comprises a pair of side walls 20, 22 defining an open-ended channel 18 that extends substantially the length of waveguide 12. And, in this exemplary embodiment, the housing 14 also includes a floor portion 32, connecting the two side walls 20, 22 so that the housing has a substantially U-shape. The housing 14 preferably not only functions to house the light source 24 and circuit elements, but also to collect light not emitted directly into the light-receiving surface 15 and redirect it into the waveguide 12. As such, as best illustrated in FIG. 3, the internal surfaces of the side walls 20, 22, and the floor portion 32 may be constructed of or coated with a light-reflecting material (e.g., white paint or tape) in order to increase the light collection efficiency by reflecting the light incident upon the internal surfaces of the housing 14 into the waveguide 12.

As a further refinement, from a viewer's perspective, it is desirable that the visual appearance of the housing 14 not be obtrusive with respect to the glowing, light-emitting surface 13 of the waveguide 12. Therefore, it is preferred that the outside surfaces of the housing 14 be constructed of or coated with a light absorbing material 34 (e.g., black paint or tape).

Finally, in the embodiment illustrated in FIGS. 1–3, the positioning of the light source 24 and circuit board 26 within the channel 18 may be maintained by filling the channel 18 with potting material 28.

Figure 4:
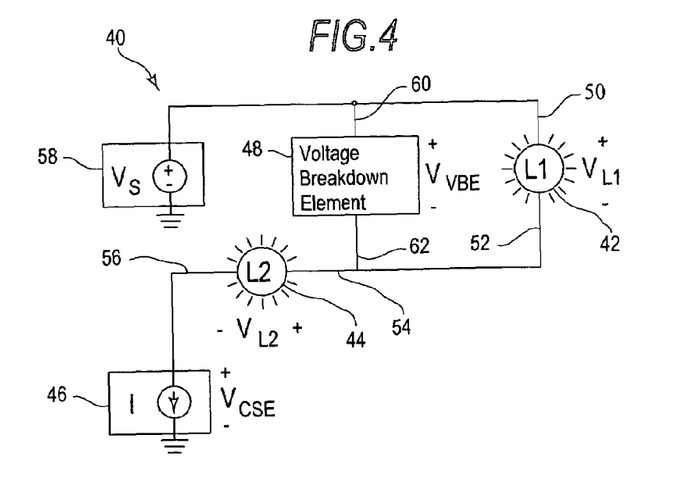
FIG. 4 is a circuit diagram of an exemplary circuit for use with a cuttable illumination device made in accordance with the present invention.

FIG. 4 shows the basic circuit 40 of the invention that allows an illumination device made in accordance with the present invention to be cut or trimmed. Specifically, the basic circuit 40 has a first lamp 42, a second lamp 44, a current source element 46, and a voltage breakdown element 48. The first lamp 42 has an input 50 and an output 52. Likewise, the second lamp 44 has an input 54 and an output 56, with the second lamp input 54 being connected to the first lamp output 52, such that the lamps are connected in series. The second lamp output 56 is connected to ground through a current source element 46, which has a substantially constant current characteristic. Completing the circuit, the first lamp input 50 is connected to an appropriate power supply 58, selected to supply adequate power to operate the circuit. Additionally, the voltage breakdown element 48 has an input 60 and an output 62. The voltage breakdown element input 60 is connected to the first lamp input 50, and the voltage breakdown element output 62 is connected to the first lamp output 52, such that the voltage breakdown element 48 and the first lamp 42 are connected in parallel.

In operation, the current source element 46 will drive the first lamp 42 and second lamp 44 with a constant current. As used herein, the element referred to as a current source element is intended to refer to any element, active, passive or otherwise, or a functional equivalent, that generates, produces, regulates, controls, governs or maintains a substantially constant flow of current over the normal operating range and conditions of the illumination device of the invention. By selecting lamps having similar electrical characteristics, the lamps 42, 44 will provide uniform illumination for use with the illumination device 10 structure described above. The lamps 42, 44 will have a voltage drop characteristic, $V_{L1}$ and $V_{L2}$ respectively, associated with the constant current characteristic of the current source element 46. Likewise, the current source element 46 will have a voltage drop characteristic, $V_{CSE}$. $V_{CSE}$ may include a range of voltages for which the constant current characteristic may be maintained.

The voltage breakdown element 48 has a breakdown voltage characteristic $V_{VBE}$, below which the voltage breakdown element 48 operates as a substantially open circuit, or as an open switch. As used herein, the element referred to as a voltage breakdown element is intended to refer to any element, active, passive or otherwise, or a functional equivalent not limited to a unitary silicone device, that acts as an open circuit when biased below a certain voltage threshold, and conducts current when biased above that voltage threshold. The voltage breakdown element 48 of the circuit 40 is selected such that $V_{VBE}$ is greater than $V_{L1}$. Therefore, in normal operation, the voltage breakdown element 48 will operate as a substantially open circuit. However, the voltage, $V_S$, of the power supply is selected such that, upon removal of the first lamp 42 from the circuit 10, the voltage across the voltage breakdown element 48 will exceed $V_{VBE}$ thereby pushing the voltage breakdown element 48 into operation in the breakdown region and completing the circuit such that the second lamp 44 may continue to operate. Preferably, $V_{VBE}$ is selected to be only slightly greater than $V_{L1}$. The current source element 46 will cause the second lamp 44 to operate at substantially the same performance as prior to removal of the first lamp 42 from the circuit.

Figure 5:
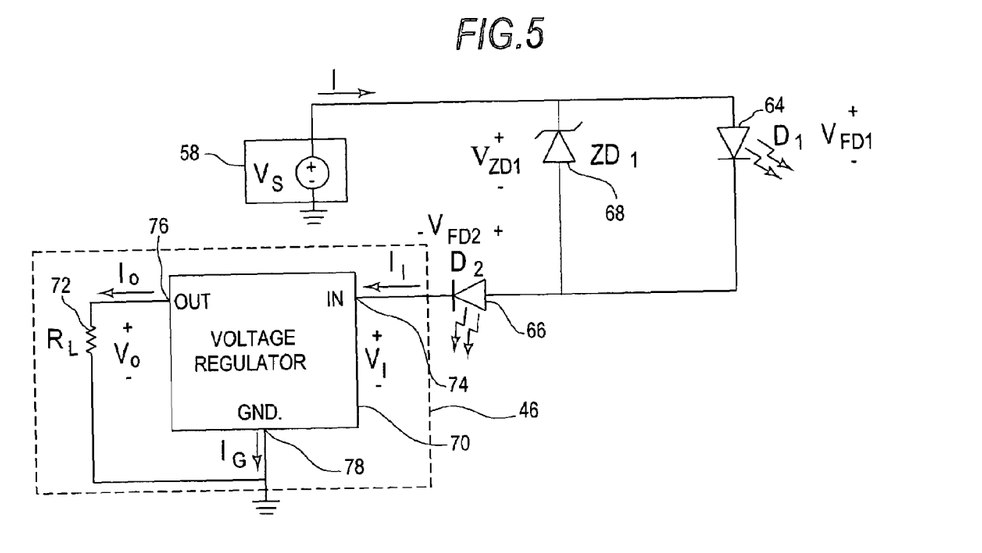
FIG. 5 is a circuit diagram of a circuit in accordance with the principles of the basic circuit of FIG. 4.

FIG. 5 is a diagram of a circuit in accordance with the principles of the basic circuit 40 of the invention, using exemplary circuit elements where: the first lamp 42 and second lamp 44 are light-emitting diodes (LEDs) 64, 66; the voltage breakdown element 48 is a Zener diode, $ZD_1$ (also indicated by reference numeral 68); and the current source element 46 is a voltage regulator 70 in combination with a load resistor, $R_L$, 72.

The voltage regulator 70 has an input 74, an output 76, and a ground connection 78. The voltage regulator 70 maintains a substantially constant output voltage, $V_O$, at the output 76 for a range of input voltages, $V_{1min}$–$V_{1max}$, at the input 74. The ground connection 78 is connected to ground, and has a negligible current, $I_G$. Thus, the input current, $I_I$, at the voltage regulator input 74 is substantially the same as the output current, $I_O$, at the output 76. By placing $R_L$ between the voltage regulator output 76 and ground, the resulting current, $I_O = V_O/R_L = I_I$, will establish the constant current through each of the LEDs 64, 66.

When properly forward biased, the LEDs 64, 66 will have forward voltage drops, $V_{FD1}$, $V_{FD2}$, respectively, that are substantially the same. The LEDs 64, 66 have a maximum forward voltage characteristic, $V_{Fmax}$, that can be used for design purposes in selecting a Zener diode 68 having a Zener breakdown voltage, $V_{ZD1}$, that is greater than $V_{Fmax}$. The LEDs 64, 66 also have a minimum forward voltage characteristic, $V_{Fmin}$, used for design purposes.

The power supply 58 must be selected to supply the constant current I and a voltage, Vs, of at least $V_{1min}+V_{Fmax}+V_{ZD1}$, but less than $V_{1max}+V_{Fmin}+V_{ZD1}$.

Figure 6:
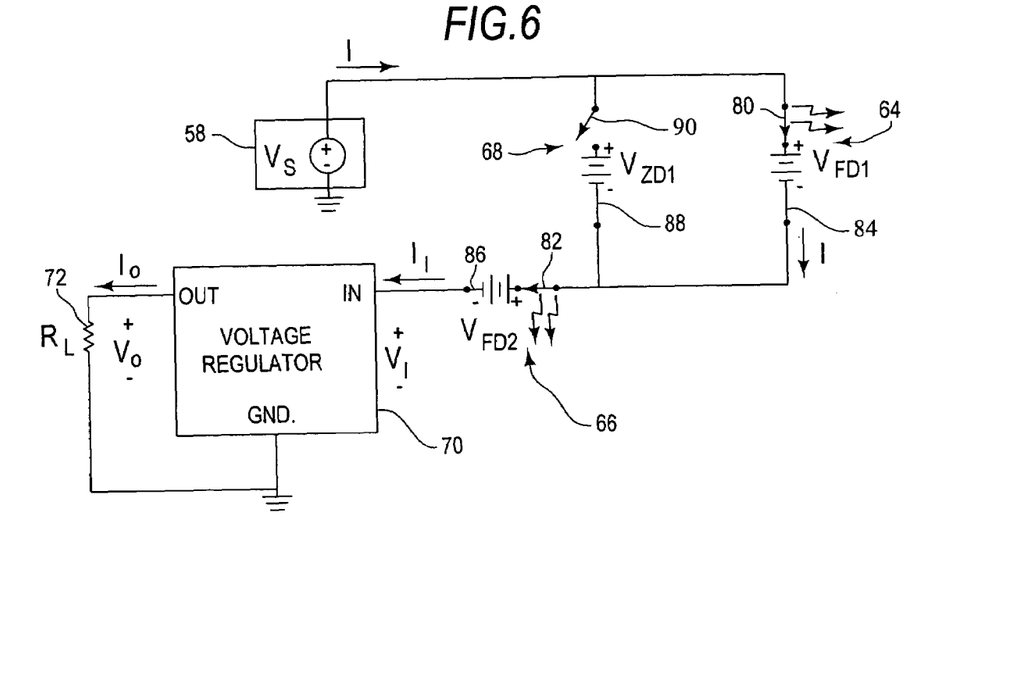
FIG. 6 is a circuit diagram of the circuit of FIG. 5 in normal operation, with some of the circuit elements replaced with equivalent second approximation elements.

FIG. 6 is a representation of the circuit of FIG. 5 in normal operation, where the LEDs 64, 66 are shown as equivalent second approximation circuits having "light-emitting switches" 80, 82, in series with batteries 84, 86, of $V_{FD1}$, $V_{FD2}$, respectively. The Zener diode 68, also is shown as an equivalent second approximation circuit, having a battery 88 in series with an open switch 90, since the Zener breakdown voltage, $V_{ZD1}$, is selected to be greater than $V_{Fmax}$.

Figure 7:
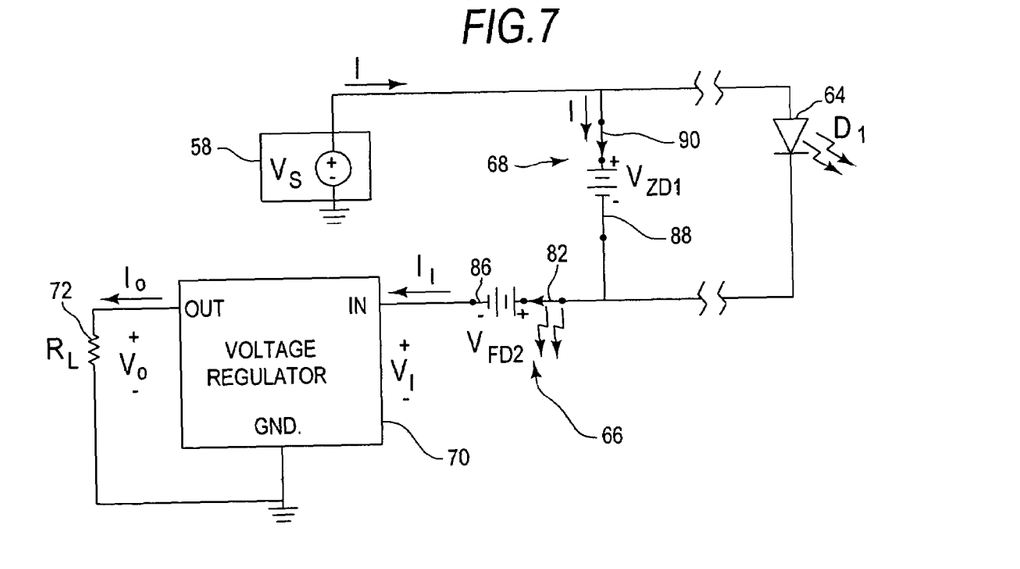
FIG. 7 is a circuit diagram of the circuit of FIG. 5 with the first LED removed from the circuit.

FIG. 7 is a representation of the circuit of FIG. 5 where the first LED 64 has been cut, trimmed or otherwise severed from the remainder of the circuit. Under these circumstances, the equivalent second approximation circuit for the Zener diode 68 has switch 90 in a closed position, completing the remaining portion of circuit and allowing it to continue to operate with substantially the same function and performance.

Figure 8:
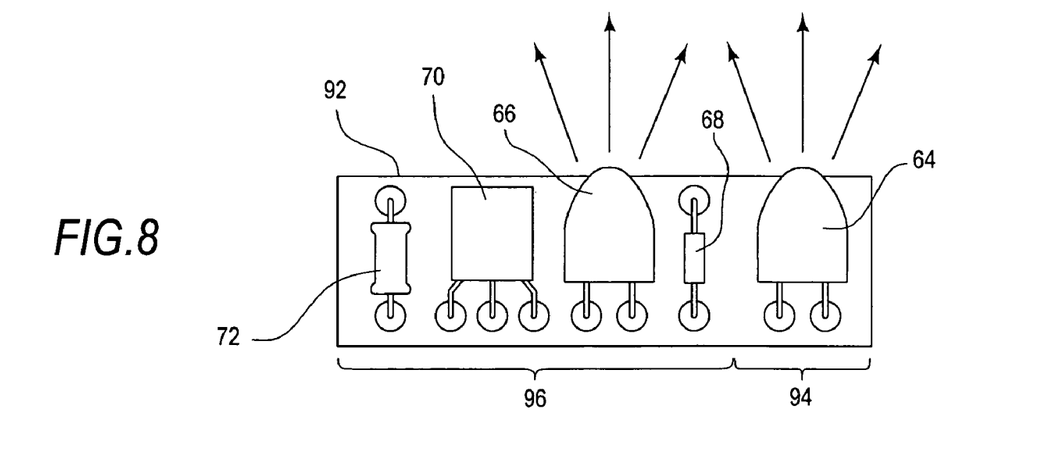
FIG. 8 is top view of a circuit board having the components of the circuit of FIG. 5 mounted thereon.

FIGS. 8 shows the components of the representative circuit of FIG. 5 mounted to an elongated circuit board element 92. Conductive traces connecting the leads of the elements according to the circuit diagram of FIG. 5 could be located on the back (not shown) of the circuit board element 92, sandwiched in layers (not shown) of the circuit board element 92, or in any other equivalent manner known in the art. Additionally, the circuit board element 92 could be rigid, flexible, or of any other suitable character. The circuit board element has a distal portion 94 and a remaining portion 96. The first LED 64 is mounted to the distal portion 94, and the Zener diode 68 and second LED 66 are mounted to the remaining portion 96.

Figure 9:
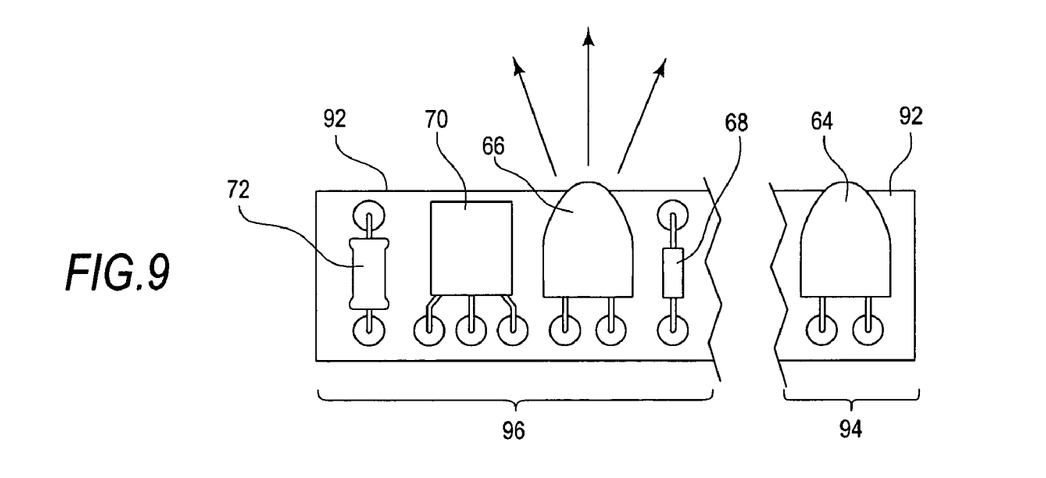
FIG. 9 is a view of the circuit board of FIG. 8, with a distal portion cut or trimmed from the remaining portion of the circuit board.

Thus, as shown in FIG. 9, the distal portion 94 of the circuit board may be cut from the remaining portion 96, thereby severing the first LED 64 from the remaining portion of the circuit. As described above, under these circumstances, the Zener diode 68 would complete the remaining portion of the circuit, allowing it to continue to operate with substantially the same function and performance.

Figure 10:
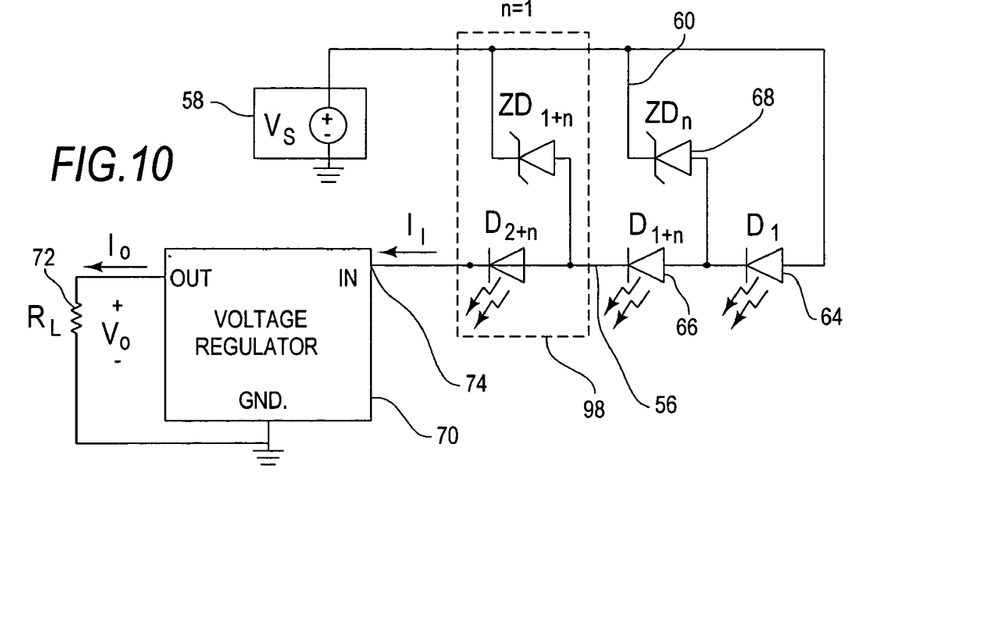
FIG. 10 is a circuit diagram of a circuit having a Zener diode/LED section added to create a string of LEDs in accordance with the invention.

As shown in FIG. 10, the principles of the invention may be applied to create strings or chains of LEDs by adding LED/Zener diode sections 98 to the basic circuit, allowing any number of lamps to be cut from the illumination device without adversely effecting the function and performance of the remaining portion of the illumination device. Thus, any number of sections, n, may be added to the basic circuit. Each LED/Zener diode section 98 will have a Zener diode, $ZD_{1+n}$, and an LED, $D_{2+n}$, where n represents the number of LED/Zener diode sections 98 added to the basic circuit. The LED, $D_{2+n}$, is inserted between the output of the LED, $D_{1+n}$, of the previous section and the voltage regulator input 74. The Zener diode, $ZD_{1+n}$, is connected between the input 60 of the Zener diode, $DZ_n$, of the previous section, and the output 56 of the LED, $D_{1+n}$, of the previous section. Thus, each successive Zener diode, $ZD_{1+n}$, must have a Zener breakdown voltage greater than the sum of the maximum forward voltages drops $V_{Fmax}$ of the (1 plus n) LEDs beyond the Zener diode, $ZD_{1+n}$, that might be cut from the circuit, or $(n+1)*V_{Fmax}$. Likewise, the power supply 58 should be selected to supply the constant current, I, and an appropriate voltage, $V_S$, for operating the circuit elements.

Figure 11:
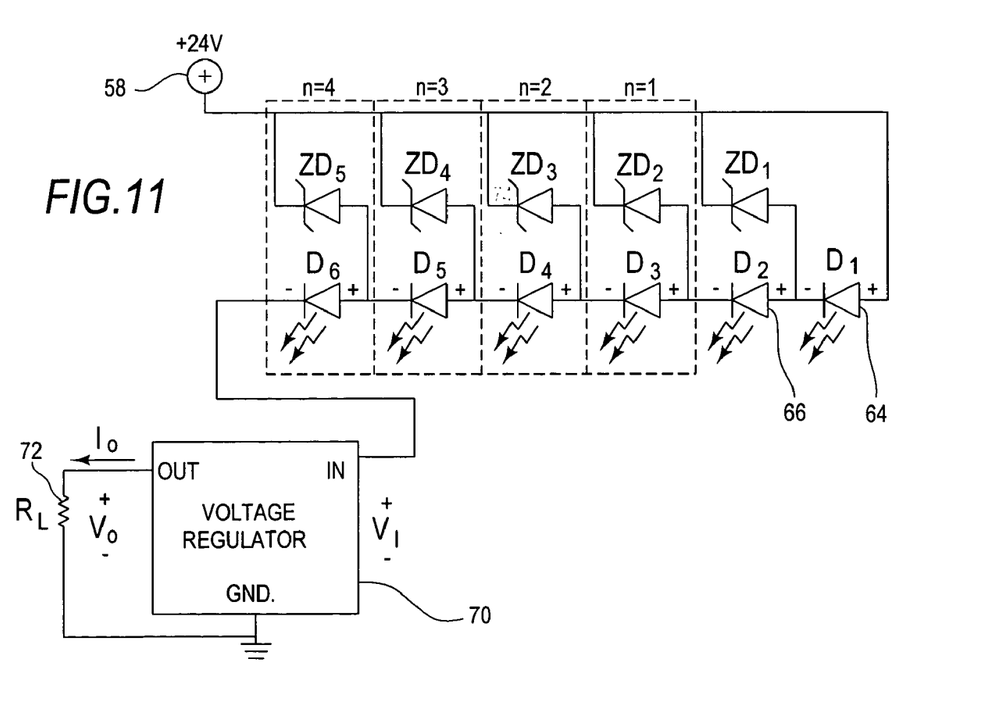
FIG. 11 is a circuit diagram of a cuttable circuit having several Zener diode/LED sections in accordance with the invention.
Figure 12:
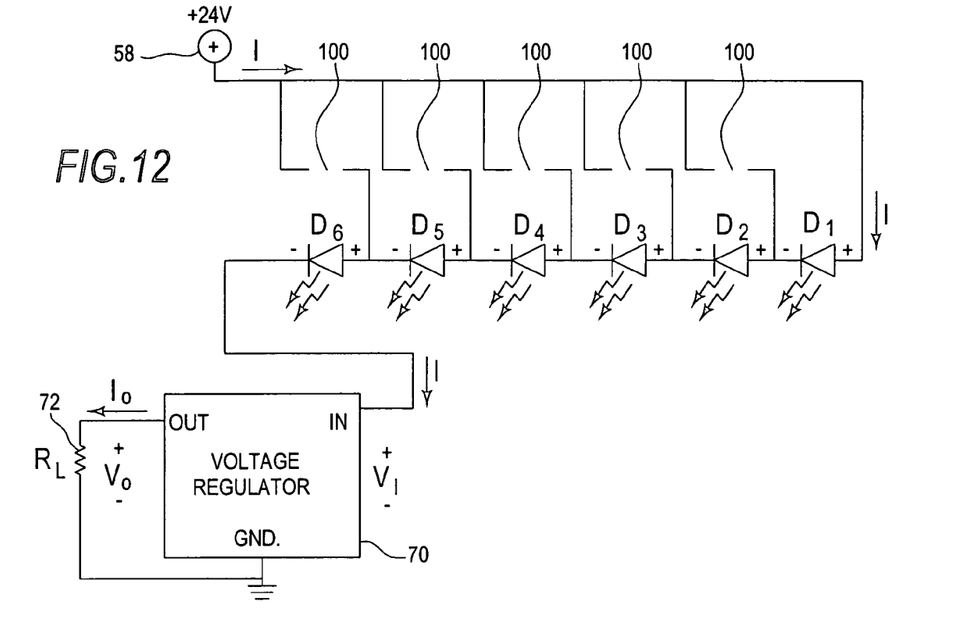
FIG. 12 is a circuit diagram of the circuit of FIG. 11 in normal operation, with the Zener diodes shown as open circuit elements.
Figure 13:
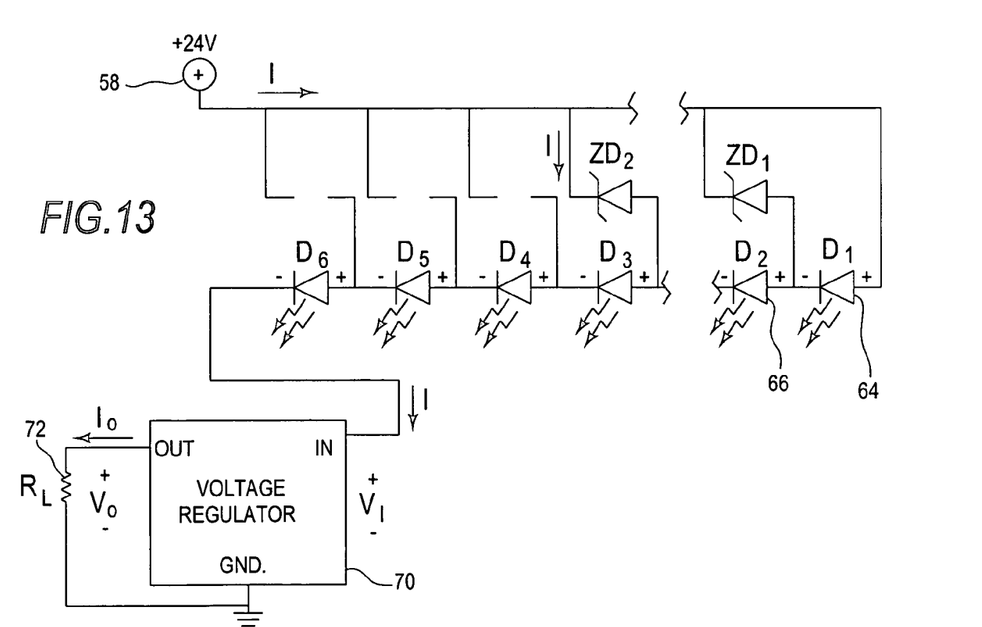
FIG. 13 is a circuit diagram of the circuit of FIG. 11 with two LEDs removed from the circuit.

For example, the circuit of FIGS. 11–13 contains four (n=4) LED/Zener diode sections 98 in addition to the basic circuit. Thus, the value of each Zener diode, $ZD_{1+n}$, is chosen to have a Zener breakdown voltage greater than the sum of the maximum forward voltages drops $V_{Fmax}$ of the (n plus 1) LEDs beyond the Zener diode, $ZD_{1+n}$, that might be cut from the circuit. Assuming the LEDs have a $V_{Fmax}$ of 2.4 Volts, the Zener diodes can be selected as in Table A.

TABLE A

| n | (n + 1) * $V_{Fmax}$ | $V_{ZD1+n}$ greater than: |
|---|---|---|
| 1 | (1 + 1) * 2.4 Volts | 4.8 Volts |
| 2 | (2 + 1) * 2.4 Volts | 7.2 Volts |
| 3 | (3 + 1) * 2.4 Volts | 9.6 Volts |
| 4 | (4 + 1) * 2.4 Volts | 12.0 Volts |

The value of the basic circuit Zener diode, $ZD_1$, of course, must be greater than 2.4 Volts, as discussed earlier. Furthermore, assuming that the voltage regulator 70 maintains a constant output voltage, $V_O$, of 5 Volts with a minimum input voltage, $V_{1min}$, of 6.5 Volts, the power supply 58 must supply a voltage, $V_S$, greater than $V_{1min}+V_{Fmax}+V_{ZD1+n}=6.5$ Volts+2.4 Volts+12.0 Volts=20.9 Volts. Thus, a supply voltage, $V_S$, of 24 Volts is selected for the example (this will allow a power supply with an approximately 10% tolerance to be used). With 5 Volts being provided across the load resistor 72, the current driven through the LEDs is equal to 5 Volts/R. Assuming a resistance of 200 Ohms, the current through the resistor would be 25 mA, which is substantially equivalent to the current through each LED since the current in the ground connection of the voltage regulator is negligible.

As shown in FIG. 12, in normal operation, the Zener diodes effectively are open circuits 100 because the reverse voltage across each of them is less than the corresponding Zener breakdown voltage.

Now, as shown in FIG. 13, if LEDs $D_1$ and $D_2$ are removed from the circuit through the cutting or sawing of the illumination device, Zener diode $ZD_2$ will begin to conduct current (although all other Zener diodes continue not to conduct). Because the Zener breakdown voltage was chosen such that $ZD_2$ is greater than $2*V_{Fmax}$, the input voltage on the regulator is still greater than 6.5V, $[24-V_{ZD2}-(4*V_{Fmax})]$, and the output of the regulator is still 5V. This maintains the constant current of 25 mA through the remaining LEDs and $ZD_2$. Thus, each time that an LED is cut out or removed, the remaining LEDs continue to function at a constant current of 25 mA.

It will be obvious to those skilled in the art that other modifications may be made to the invention as described herein without departing from the spirit and scope of the present invention. For instance, polarities may be reversed and power supply and control elements may be moved to alternate nodes in the circuit of the invention without altering the operating principles of the invention disclosed and claimed herein.

What is claimed is:

1. A cuttable illumination device, comprising:
   a first lamp having an input and an output;
   a second lamp having an input and an output, said second lamp input connected to said first lamp output, such that said lamps are connected in series;
   a current source element having a substantially constant current characteristic, said current source element connected to said second lamp output, said first lamp having a voltage drop characteristic corresponding to said current characteristic of said current source element; and
   a voltage breakdown element having an input and an output, said voltage breakdown element input connected to said first lamp input and said voltage breakdown element output connected to said first lamp output, said voltage breakdown element having a breakdown voltage characteristic that is greater than said first lamp voltage drop characteristic.

2. The cuttable illumination device of claim 1, wherein said first lamp is a first light-emitting diode (LED) and wherein said second lamp is a second LED.

3. The cuttable illumination device of claim 2, wherein said first LED has a maximum forward voltage characteristic, and wherein said voltage breakdown element is a Zener diode having a voltage breakdown characteristic that is greater than said first LED maximum forward voltage characteristic.

4. The cuttable illumination device of claim 3, wherein said current source element has:
   a voltage regulator having an input, an output, and a ground connection, said voltage regulator input connected to said second LED output, said voltage regulator ground connection connected to ground, said voltage regulator having a substantially fixed output voltage characteristic, said voltage regulator having a ground current characteristic that is negligible, such that the voltage regulator output current substantially equals the voltage regulator input current; and
   a load resistor having an input and an output, said load resistor input connected to said voltage regulator output, said load resistor output connected to ground, such that said substantially fixed output voltage characteristic across said load resistor will create said substantially constant current source current characteristic.

5. The cuttable illumination device of claim 4, further having an elongated circuit board element having a distal portion and a remaining portion, wherein said first LED is mounted to said circuit board distal portion, and said Zener diode and said second LED are mounted to said remaining portion, such that said circuit board distal portion may be cut from said circuit board remaining portion, thereby severing said first LED from said cuttable illumination device.

6. The cuttable illumination device of claim 5, further having a waveguide member having:
   a rod-like shape;
   a predetermined length;
   a lateral light-receiving surface; and
   a lateral light-emitting surface;
   said waveguide member being composed of a material that has both optical waveguide and light scattering properties;
   the light-receiving surface of said waveguide member being positioned adjacent said first LED and said second LED, such that light from said LEDs entering said waveguide member is preferentially scattered causing a light intensity pattern that appears substantially uniform along the light-emitting surface of said waveguide member.

7. The cuttable illumination device of claim 6, further comprising a housing positioned below and extending along said waveguide member, said housing enclosing said circuit board, said first LED, said Zener diode and said second LED.

8. The cuttable illumination device of claim 7, wherein said housing has a pair of side walls and a floor portion connecting said side walls, said side walls and said floor portion defining a channel that extends substantially said predetermined length of said waveguide member, said circuit board, said first LED, said Zener diode and said second LED received within said channel.

9. The cuttable illumination device of claim 8, wherein said side walls and said floor portion have internal surfaces that are reflective.

10. The cuttable illumination device of claim 7, wherein the position of said circuit board, said first LED, said Zener diode and said second LED within said housing are maintained by filling said channel with potting material.

11. The cuttable illumination device of claim 4, further having an additional LED/Zener diode section, said additional LED/Zener diode section having:
   a third LED inserted between said second LED output and said voltage regulator input; and
   a second Zener diode having an input and an output, said second Zener diode input connected to said first Zener diode input, said second Zener diode output connected to said second LED output, said second Zener diode having a voltage breakdown characteristic greater than the sum of the maximum forward voltage drops of said first LED and said second LED.

12. The cuttable illumination device of claim 4, further having a number of additional LED/Zener diode sections, each successive LED/Zener diode section characterized by an incremental number, n, each successive LED/Zener diode section having:
   an LED, $D_{2+n}$, inserted between the output of the LED, $D_{1+n}$, of the previous section and said voltage regulator input; and
   a Zener diode, $ZD_{1+n}$, having an input and an output, each successive Zener diode, $ZD_{1+n}$, input connected to the input of the Zener diode, $ZD_n$, of the previous section, each successive Zener diode, $ZD_{1+n}$, output connected to said output of the LED, $D_{1+n}$, of the previous section, each successive Zener diode, $ZD_{1+n}$, having a voltage breakdown characteristic greater than the sum of the maximum forward voltage drops of the LEDs, $D_1$ through $D_{1+n}$, of the cuttable illumination device.

13. A method of shortening the length of an illumination device without adversely effecting the function and performance of the remaining portion of the illumination device, said method of shortening comprising:
   providing a cuttable illumination device having:
   a first lamp having an input and an output;
   a second lamp having an input and an output, said second lamp input connected to said first lamp output, such that said lamps are connected in series;
   a current source element having a substantially constant current characteristic, said current source element connected to said second lamp output, said first lamp having a voltage drop characteristic corresponding to said current characteristic of said current source element;
   a voltage breakdown element having an input and an output, said voltage breakdown element input connected to said first lamp input and said voltage breakdown element output connected to said first lamp output, said voltage breakdown element having a breakdown voltage characteristic that is greater than said first lamp voltage drop characteristic; and
   an elongated circuit board element having a distal portion and a remaining portion, wherein said first lamp is mounted to said circuit board distal portion, and wherein said second lamp, said current source element, and said voltage breakdown element are mounted to said circuit board remaining portion; and
   cutting said circuit board distal portion from said circuit board remaining portion, thereby severing said first lamp from said cuttable illumination device and shortening the length of said circuit board without adversely effecting the function and performance of the remaining portion of the illumination device.

14. The method of shortening the length of an illumination device of claim 13, wherein said first lamp and said second lamp are light-emitting diodes (LEDs), wherein said voltage breakdown element is a Zener diode, and wherein said current source element has a voltage regulator and a load resistor, said load resistor connected between the output of the voltage regulator and ground.

15. The method of shortening the length of an illumination device of claim 14, wherein said cuttable illumination device further has:
   a waveguide member having a rod-like shape, a predetermined length, a lateral light-receiving surface, and a lateral light-emitting surface, said waveguide member being comprised of a material that has both optical waveguide and light scattering properties, the light-receiving surface of said waveguide member being positioned adjacent said LEDs;
   a housing positioned below and extending along said waveguide member, said housing enclosing said circuit board, said LEDs, said Zener diode, said voltage regulator and said load resistor, said housing having a pair of side walls and a floor portion
   connecting said side walls, said side walls and floor portion having reflective internal surfaces; and
   potting material between said circuit board and said housing.

16. A cuttable illumination device, comprising:
   a first lamp having an input and an output;
   a second lamp having an input and an output, said second lamp input connected to said first lamp output, such that said lamps are connected in series;
   a means for generating a substantially constant current through said first lamp and said second lamp;
   a means for conducting current at a predetermined voltage threshold that is greater than the voltage across said first lamp, said means for conducting current being connected across said first lamp; and
   a power supply for supplying power to said first lamp, said second lamp, said means for generating a substantially constant current, and said means for conducting current at a predetermined voltage threshold.

17. The cuttable illumination device of claim 16, wherein said means for generating a substantially constant current has:
   a voltage regulator having an input, an output, and a ground connection, said voltage regulator input connected to said second lamp output, said voltage regulator ground connection connected to ground, said voltage regulator having a substantially fixed output voltage characteristic, said voltage regulator having a ground current characteristic that is negligible, such that the voltage regulator output current substantially equals the voltage regulator input current; and
   a load resistor having an input and an output, said load resistor input connected to said voltage regulator output, said load resistor output connected to ground, such that said substantially fixed output voltage characteristic across said load resistor will generate said substantially constant current.

18. The cuttable illumination device of claim 17, wherein said means for conducting current at a predetermined voltage threshold is a Zener diode.

19. The cuttable illumination device of claim 18, wherein said first lamp is a first light-emitting diode (LED) and wherein said second lamp is a second LED.

20. The cuttable illumination device of claim 19, further having an elongated circuit board element having a distal portion and a remaining portion, wherein said first LED is mounted to said circuit board distal portion and said Zener diode and said second LED are mounted to said remaining portion, such that said circuit board distal portion may be cut from said circuit board remaining portion thereby severing said first LED from said cuttable illumination device.

21. The cuttable illumination device of claim 20 further having a waveguide member having:
   a rod-like shape;
   a predetermined length;
   a lateral light-receiving surface; and
   a lateral light-emitting surface;
   said waveguide member being comprised of a material that has both optical waveguide and light scattering properties;
   the light-receiving surface of said waveguide member being positioned adjacent said first LED and said second LED, such that light from said LEDs entering said waveguide member is preferentially scattered causing a light intensity pattern that appears substantially uniform along said the light-emitting surface of said waveguide member.

22. The cuttable illumination device of claim 21, further comprising a housing positioned below and extending along said waveguide member, said housing enclosing said circuit board, said first LED, said Zener diode and said second LED.

23. The cuttable illumination device of claim 22, wherein said housing has a pair of side walls and a floor portion connecting said side walls, said side walls and said floor portion defining a channel that extends substantially said predetermined length of said waveguide member, said circuit board, said first LED, said Zener diode and said second LED received within said channel.

24. The cuttable illumination device of claim 23, wherein said side walls and said floor portion have internal surfaces that are reflective.

25. The cuttable illumination device of claim 23, further having potting material filling said channel, wherein the position of said circuit board, said first LED, said Zener diode and said second LED within said housing are maintained by said potting material.

26. The cuttable illumination device of claim 19, further having an additional LED/Zener diode section, said additional LED/Zener diode section having:
   a third LED inserted between said second LED output and said voltage regulator input; and
   a second Zener diode having an input and an output, said second Zener diode input connected to said first Zener diode input, said second Zener diode output connected to said second LED output, said second Zener diode having a voltage breakdown characteristic greater than the sum of the maximum forward voltage drops of said first LED and said second LED.

27. The cuttable illumination device of claim 19, further having a number of additional LED/Zener diode sections, each successive LED/Zener diode section characterized by an incremental number, n, each successive LED/Zener diode section having:
   an LED, $D_{2+n}$, inserted between the output of the LED, $D_{1+n}$, of the previous section and said voltage regulator input; and
   a Zener diode, $ZD_{1+n}$, having an input and an output, each successive Zener diode, $ZD_{1+n}$, input connected to the input of the Zener diode, $ZD_n$, of the previous section, each successive Zener diode, $ZD_{1+n}$, output connected to said output of the LED, $D_{1+n}$, of the previous section, each successive Zener diode, $ZD_{1+n}$, having a voltage breakdown characteristic greater than the sum of the maximum forward voltage drops of the LEDs, $D_1$ through $D_{1+n}$, of the cuttable illumination device.

* * * * *